US007559249B2

(12) United States Patent
Nakano et al.

(10) Patent No.: US 7,559,249 B2
(45) Date of Patent: Jul. 14, 2009

(54) SEAT APPARATUS FOR A VEHICLE

(75) Inventors: Satohiko Nakano, Chiryu (JP); Muneto Inayoshi, Nagoya (JP); Mutsuro Aoyama, Nagoya (JP); Hideki Kawabata, Aichi-ken (JP); Kenichiro Akizuki, Aichi-ken (JP); Minoru Izawa, Okazaki (JP)

(73) Assignees: Aisin Seiki Kabushiki Kaisha, Kariya-Shi, Aichi-Ken (JP); Toyota Jidoshi Kabushiki Kaisha, Toyota-Shi, Aichi-Ken (JP)

( * ) Notice: Subject to any disclaimer, the term of this patent is extended or adjusted under 35 U.S.C. 154(b) by 0 days.

(21) Appl. No.: 11/978,626

(22) Filed: Oct. 30, 2007

(65) Prior Publication Data

US 2008/0156103 A1 Jul. 3, 2008

(30) Foreign Application Priority Data

Oct. 31, 2006 (JP) ............................ 2006-296814
Oct. 16, 2007 (JP) ............................ 2007-268521

(51) Int. Cl.
*G01L 1/22* (2006.01)

(52) U.S. Cl. .................................... 73/781; 73/862.474

(58) Field of Classification Search ................. 177/136; 73/781, 862.474
See application file for complete search history.

(56) References Cited

U.S. PATENT DOCUMENTS 6,242,701 B1 6/2001 Breed et al.
6,477,904 B2 11/2002 Maeda et al.

(Continued)

FOREIGN PATENT DOCUMENTS

JP 2003-083707 A 3/2003

(Continued)

OTHER PUBLICATIONS

Rasul, Jad S., "Printed Wiring Board Technology," *Wiley Encyclopedia of Electrical and Electronics Engineering*, J. Webster ed., 1999, pp. 1-18, John Wiley & Sons, Inc.

(Continued)

*Primary Examiner*—Lisa M Caputo
*Assistant Examiner*—Punam Patel
(74) *Attorney, Agent, or Firm*—Buchanan Ingersoll & Rooney PC

(57) ABSTRACT

A seat apparatus for a vehicle has a load detecting device arranged between a floor-side fixing member adapted to be fixed to a floor of the vehicle and a seat-side fixing member adapted to be fixed to a seat for the vehicle and for measuring a load of an occupant seated on the seat. The load detecting device includes: a strain member; a connecting member vertically fixed to an intermediate portion of the strain member; strain gauges attached to a surface of the strain member; an upper bracket having a first and second fixed portions both fixed to the other surface of the strain member. The upper bracket further has an attachment portion connecting the first and second fixed portions and extending in a lateral direction of the seat; and an amplifier unit attached to a surface of the attachment portion of the upper bracket corresponding to the strain member so as to be coplanar with the strain member.

13 Claims, 5 Drawing Sheets

U.S. PATENT DOCUMENTS

| | | | |
|---|---|---|---|
| 7,155,981 | B2 | 1/2007 | Matsuura et al. |
| 7,189,931 | B2 | 3/2007 | Hida et al. |
| 2002/0134167 | A1 | 9/2002 | Rainey et al. |
| 2003/0106723 | A1 * | 6/2003 | Thakur et al. ............... 177/144 |
| 2005/0023065 | A1 | 2/2005 | McBride et al. |
| 2005/0150313 | A1 * | 7/2005 | Curtis et al. ........... 73/862.474 |
| 2006/0144630 | A1 | 7/2006 | Breed et al. |
| 2006/0169837 | A1 | 8/2006 | Bird et al. |
| 2006/0185446 | A1 | 8/2006 | Speckhart |
| 2008/0036185 | A1 | 2/2008 | Breed |
| 2008/0084086 | A1 | 4/2008 | Endo et al. |
| 2008/0098822 | A1 | 5/2008 | Sakamoto et al. |
| 2008/0098823 | A1 | 5/2008 | Sumi et al. |
| 2008/0127752 | A1 | 6/2008 | Nakano et al. |

FOREIGN PATENT DOCUMENTS

| | | | |
|---|---|---|---|
| JP | 2004-69535 | A | 3/2004 |
| JP | 2004-268620 | A | 9/2004 |
| JP | WO 2005/080931 | A1 | 9/2005 |
| JP | 2006-38812 | A | 2/2006 |
| WO | WO 2006/011597 | A1 | 2/2006 |

OTHER PUBLICATIONS

U.S. Appl. No. 12/203,452, filed Sep. 3, 2008, Kawabata et al.

U.S. Appl. No. 12/262,418, filed Oct. 31, 2008, Ito et al.

* cited by examiner

F I G. 3
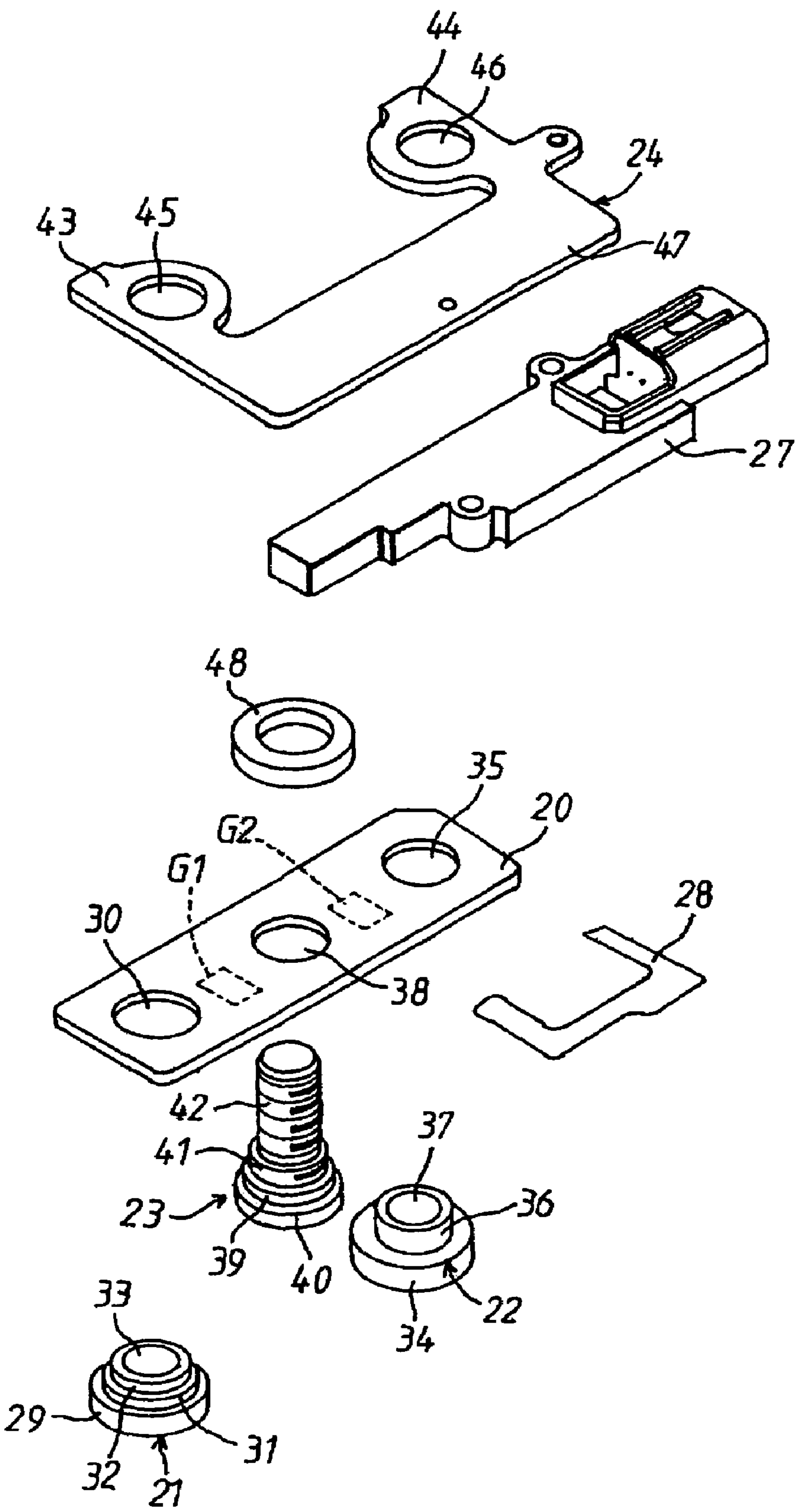

F I G. 6
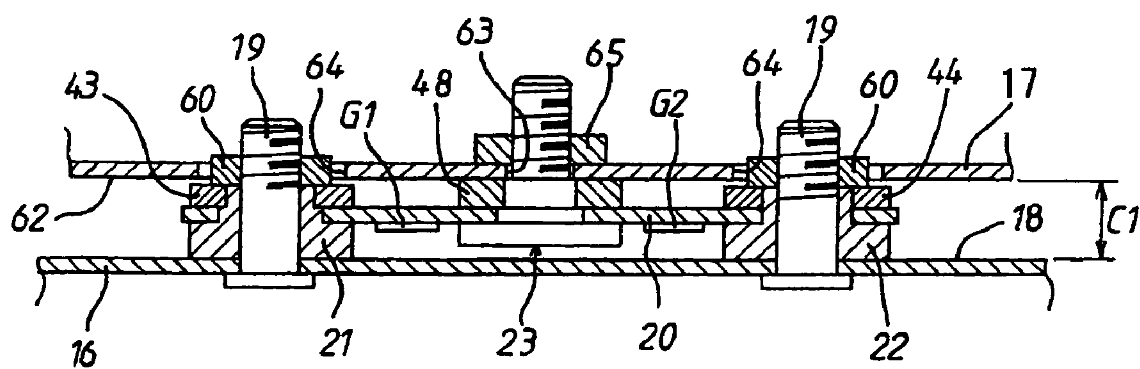

SEAT APPARATUS FOR A VEHICLE

CROSS REFERENCE TO RELATED APPLICATIONS

This application is based on and claims priority under 35 U.S.C. § 119 to Japanese Patent Application 2006-296814, filed on Oct. 31, 2006 and Japanese Patent Application 2007-268521, filed on Oct. 16, 2007, the entire content of which is incorporated herein by reference.

FIELD OF THE INVENTION

The present invention relates to a seat apparatus for a vehicle having a load detecting device for measuring a load of an occupant seat on a seat for a vehicle.

BACKGROUND

Many types of seat apparatuses each having a load detecting device for detecting a load of an occupant seated on a seat have been proposed to be applicable for vehicles mounted with airbags adapted to protect occupants. An output of the load detecting device is employed so as to appropriately adjust an amount of gas emissions of an air bag to be inflated, corresponding to a weight of an occupant. Further, when an occupant seated on a seat is determined to be a child based upon an output of the load detecting device, a pin of the air bag is controlled not to be operated.

For example, JP2006-38812A (Reference 1) discloses therein an occupant weight measurement device for a vehicle seat, in which multiple load sensors for measuring a weight of an occupant are arranged between a frame supporting a seat cushion and a pair of upper rails mounted on a pair of lower rails fixed to a floor of a vehicle to be movable in a longitudinal direction.

As illustrated in FIG. 4 of Reference 1, the load sensor includes a cylindrical sensing portion (52) having a strain gauge detecting a load; a plate-shaped flange (51) extending at a lower end of the sensing portion (52) forward and rearward in a horizontal manner; a load input rod (53) extending upwardly from an upper end of the sensing portion (52); and a connector (54) extending from the sensing portion (52) to be in parallel with the flange (51). The flange is fixed to the upper rail and the load input rod (53) is fixed to the frame supporting the seat cushion. So configured, when an occupant is seated on the seat cushion, a weight of the occupant is applied to the load sensor via the frame, and the load sensor detects the weight of the occupant as an electrical signal.

In the above-described occupant weight measurement device disclosed in Reference 1, a vertical dimension (height) of the load sensor positioned between the upper rail and the frame supporting the seat cushion may be increased, so that a distance between the upper rail and the frame may become large. That is, a large space is required between the upper rail and the frame, which large space is used to accommodate the cylindrical sensing portion and the connector of the load sensor.

Reference 1 does not disclose therein the method for processing an electrical signal transmitted from the connector. However, in general, this type of occupant weight measurement device requires an amplifier unit for amplifying an electrical signal detected by the strain gauge. In this case, according to the structure of the load sensor disclosed in Reference 1, an amplifier unit needs to be provided separately at another position, which is connected to the connector via a communication line. Therefore, an output of the load sensor is not amplified in the vicinity of the load sensor.

A need thus exists for a seat apparatus for a vehicle having a load detecting device for measuring a load of an occupant seated on a seat for a vehicle, which is not susceptible to the drawback mentioned above.

SUMMARY OF THE INVENTION

According to an aspect of the present invention, a seat apparatus for a vehicle has a load detecting device arranged between a floor-side fixing member adapted to be fixed to a floor of the vehicle and a seat-side fixing member adapted to be fixed to a seat for the vehicle and for measuring a load of an occupant seated on the seat. The load detecting device includes: a strain member fixed at its both ends at a fixing surface provided at one of the floor-side fixing member and the seat-side fixing member with a predetermined distance from the fixing surface in a vertical direction of the seat; a connecting member vertically fixed to an intermediate portion of the strain member and fixed to the other one of the floor-side fixing member and the seat-side fixing member; strain gauges attached on a surface of the strain member; a second strain gauge attached between the intermediate portion of the strain member and the other one of the both ends of the strain member on the surface of the strain member; an upper bracket having a first fixed portion and a second fixed portion both fixed to the other surface of the strain member at the both ends of the strain member, the upper bracket further having the attachment portion connecting the first and second fixed portions and extending in a lateral direction of the seat; and an amplifier unit attached to a surface of the attachment portion of the upper bracket corresponding to the strain member so as to be coplanar with the strain member.

BRIEF DESCRIPTION OF THE DRAWINGS

The foregoing and additional features and characteristics of the present invention will become more apparent from the following detailed description considered with reference to the accompanying drawings, wherein:

FIG. 3 is an exploded view illustrating the load detecting device;

FIG. 6 is a diagram for illustrating a mounted state of the load detecting device to a seat frame illustrated in FIG. 1.

DETAILED DESCRIPTION

Described below is a seat apparatus for a vehicle having load detecting devices 10 according to an embodiment of the present invention, with reference to the attached drawings. The load detecting device 10 is configured to measure a load of an occupant seated on a seat 11 for a vehicle illustrated in FIG. 1. Arrows for forward (Front), rearward (Rear), upward (Up), downward (Down), leftward (Left) and rightward (Right) are depicted as seen from an occupant seated on the seat 11. In the description, the forward and rearward directions are referred to as a longitudinal direction, the leftward and rightward directions are referred to as a lateral direction, and the upward and downward directions are referred to as a vertical direction.

Figure 1:
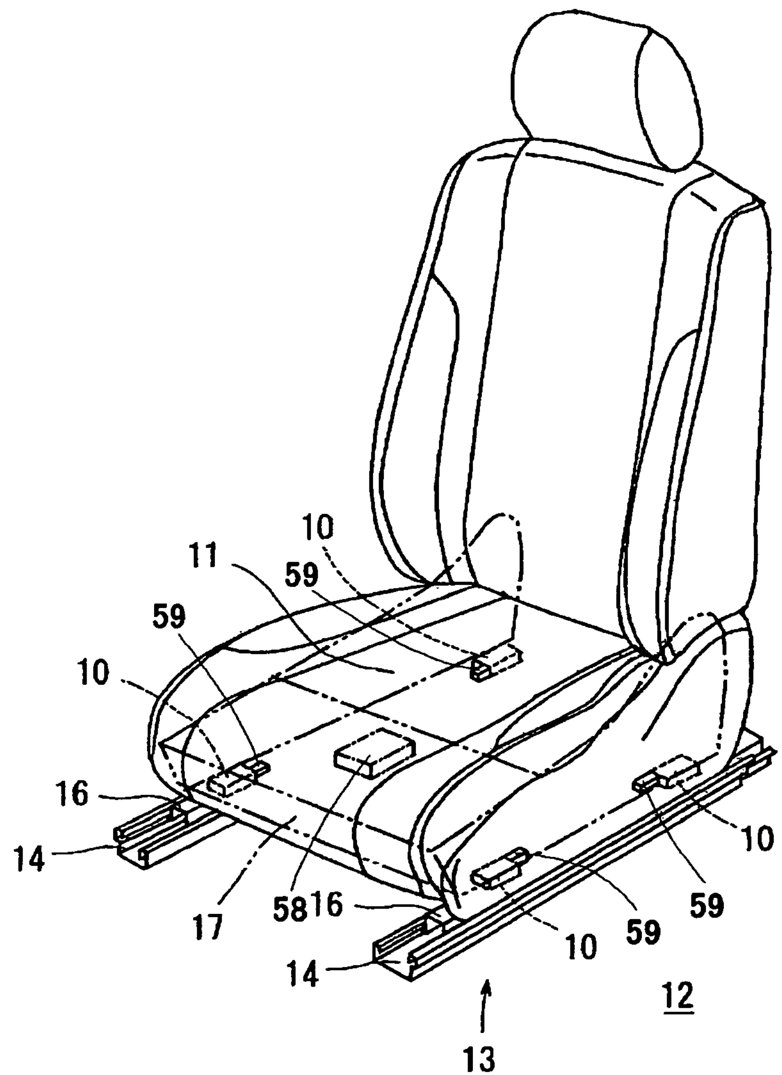
FIG. 1 is a perspective view illustrating a seat apparatus for a vehicle according to an embodiment of the present invention.
Figure 1:
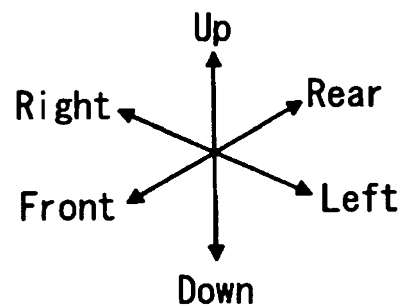

As illustrated in FIGS. 1 and 6, a seat sliding apparatus 13 is configured to adjustably secure the seat 11 to a vehicle floor 12 in a manner that the seat 11 is positioned in forward and rearward directions of the vehicle. The seat sliding apparatus 13 includes: a pair of lower rails 14 fixedly mounted on the floor 12 and extending in the forward and rearward directions of the vehicle; and a pair of upper rails 16 movably supported by the lower rails 14. The upper rails 16 serve as floor-side fixing members, respectively. A seat frame 17 is a seat-side fixing member supporting a seat cushion of the seat 11. According to the embodiment, among the four corners of the lower surface of the frame 17, two of the corners arranged in series are fixed to a fixing surface 18 formed at an upper surface of one of the upper rails 16, via the two load detecting devices 10. Other two of the corners arranged in series are fixed to a fixing surface 18 formed at an upper surface of the other one of the upper rails 16, via the two load detecting devices 10. A pair of fixing shafts 19 is arranged at each end of each upper rail 16 with a predetermined distance therebetween in the forward and rearward directions, and each end where the load detecting device 10 is located. The fixed shafts 19 protrude fixedly and vertically upwardly at each end of each upper rail 16, so that the corresponding load detecting device 10 is fixedly mounted on the fixing surface 18.

Figure 2:
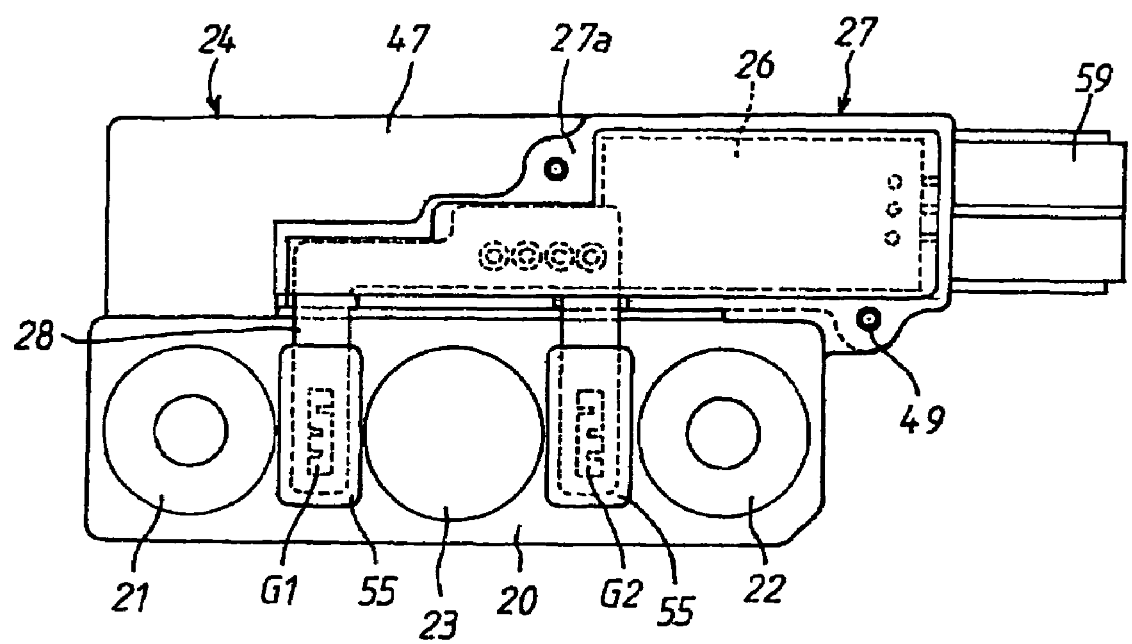
FIG. 2 is an aerial view illustrating a load detecting device illustrated in FIG. 1.

As illustrated in FIGS. 2 and 3, each load detecting device 10 includes a strain member 20 formed into an approximately rectangular plate; strain gauges G1, G2 attached to a surface (lower surface) of the strain member 20; first and second lower brackets 21, 22 securing the strain member 20 at both ends of the strain member 20 to the corresponding fixing surface 18 of the upper rail 16; and a connecting shaft 23 vertically fixed to an intermediate portion of the strain member 20. The connecting shaft 23 is firmly fixed to the frame 17 of the seat 11. Each load detecting device 10 further includes: an upper bracket 24 firmly mounted on the upper surface (the other surface) of the strain member 20 at the both ends; an amplifier unit 27 having an amplifier case 27*a* attached to a lower surface of an attachment portion 47 of the upper bracket 24 along with the strain member 20 and housing an amplifier substrate 26 for amplifying signals transmitted by the strain gauges G1, G2; and an FPC (Flexible Printed Circuits) substrate 28 connected to the strain gauges G1, G2 and to the amplifier substrate 26. As illustrated in FIG. 2, coatings 55, 55 protect connecting portions between the FPC substrate 28 and the strain gauges G1, G2, respectively.

Figure 4:
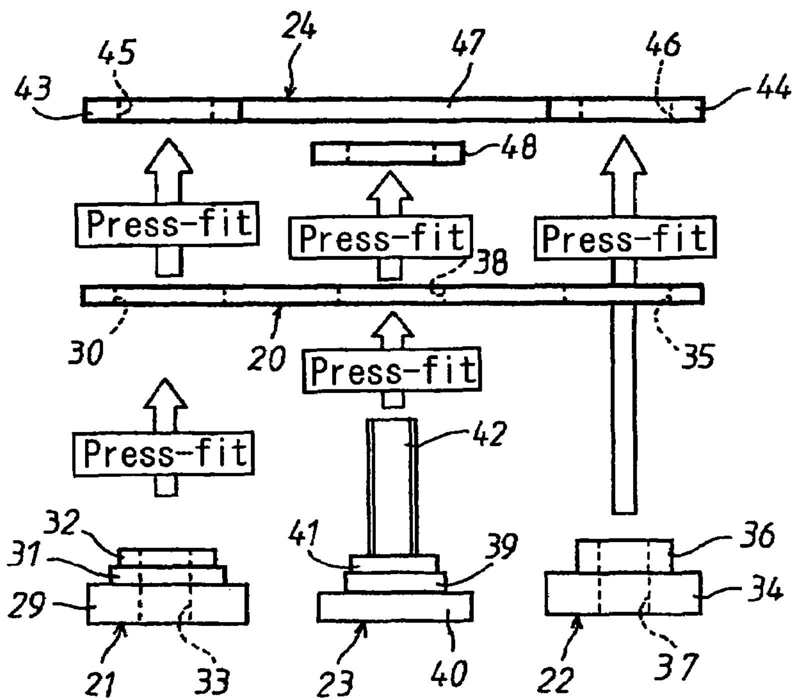
FIG. 4 is a diagram for explaining assembling of lower brackets and a connecting shaft on the strain member.

As is obvious from FIGS. 3 and 4, the first lower bracket 21 is structured with: an approximately circular base portion 29 having a predetermined thickness in the vertical direction (height); an intermediate shaft portion 31 (shaft portion) protruding from the base portion 29 upwardly and press-fitted into a hole 30 formed at the one end of the strain member 20; an upper shaft portion 32 (shaft portion); protruding from the intermediate shaft portion 31 upwardly; and an attachment hole 33 defined at the center of the first lower bracket 21 and penetrating therethrough. The upper shaft portion 32 is press-fitted also into the upper bracket 24 (the first fixed portion 43). The attachment hole 33 may penetrate the base portion 29 and the upper shaft portion 32, so that the first lower bracket 21 is engaged with a bolt. The second lower bracket 22 is structured with: an approximately circular base portion 34 having a predetermined thickness in the vertical direction (height); a shaft portion 36 (shaft portion) protruding from the base portion 34 upwardly and loosely inserted into a hole 35 defined at the other end of the strain member 20; and an attachment hole 37 defined at the center of the second lower bracket 22 and penetrating therethrough. The shaft portion 36 is press-fitted into the upper bracket 24 (the second fixed portion 44). The attachment hole 37 may penetrate the base portion 34 and the shaft portion 36, so that the second lower bracket 22 is engaged with a blot.

The hole 30 and the hole 35 are formed at the both ends of each strain member 20 with the same distance as the distance of each pair of fixed shafts 19. As illustrated in FIG. 4, where the first and second lower brackets 21, 22 are inserted into the strain member 20, the base portion 29 of the first lower bracket 21 and the base portion 34 of the second lower bracket 22 come in contact with the lower surface of the strain member 20. In this case, the intermediate shaft portion 31 of the first lower bracket 21 is press-fitted into the hole 30 of the strain member 20, while the shaft portion 36 of the second lower bracket 22 is loosely inserted into the hole 35 of the strain member 20. The strain member 20 is further formed with an intermediate hole 38, into which an intermediate shaft portion 39 of the connecting shaft 23 is press-fitted. The connecting shaft 23 includes, at its end, a flange portion 40 having a smaller thickness than that of the base portions 29, 34 of the first and second lower brackets 21, 22. The flange portion 40 of the connecting shaft 23 comes in contact with the lower surface of the strain member 20 when the connecting shaft 23 is press-fitted into the intermediate hole 38 of the strain member 20. The connecting shaft 23 further includes an upper shaft portion 41 protruding from the upper surface of the intermediate shaft portion 39, and a fixed threaded portion 42 protruding from the upper surface of the upper shaft portion 41. The upper shaft portion 41 of the connecting shaft 23 is press-fitted into a central bracket 48 in a state where the intermediate shaft portion 39 of the connecting shaft 23 is press-fitted into the central hole 38 of the strain member 20. So configured, the connecting shaft 23 is firmly fixed to the strain member 20 with the strain member 20 interposed between the flange 40 and the central bracket 48. According to the embodiment, the intermediate shaft portion 31 is press-fitted into the hole 30 of the strain member 20. Alternatively, the intermediate shaft portion 31 can be just inserted, fitted, adhered, or the like.

Therefore, when the load of the occupant seated on the seat 11 is applied to the strain member 20 via the connecting shaft 23, the strain member 20 is flexibly bent while being supported at the both ends by the first and second lower brackets 21, 22. Therefore, at each area between the connecting shaft 23 and each first and second lower bracket 21, 22 on the surface of the strain member 20, compressive strain are generated at the sides of the first and second brackets 21, 22, and tensile strain are generated at the sides of the connecting shaft 23. Degrees of the compressive strain and the tensile strain are in proportion to the load of the occupant applied to the strain member 20. In order to detect the compressive strain and the tensile strain, the strain gauges G1, G2 are respectively attached to the areas between the central portion of the strain member 20 and the both ends of the strain member 20, i.e., to the areas between the connecting shaft 23 and the first and second lower brackets 21, 22. Each strain gauge G1, G2 incorporates therein two elements configuring half-bridges, and a full-bridge is configured with each half-bridge of the stain gauges G1, G2. Accordingly, the strain gauges G1, G2 output an electrical signal corresponding to the load applied to the strain member 20. According to the embodiment, compressive strain are generated at the sides of the first and second brackets 21, 22, and tensile strain are generated at the sides of the connecting shaft 23. Alternatively, it is possible to arrange the strain member 20 at which, compressive strain or tensile strain is generated only at the sides of the first and second brackets 21, 22 or to arrange the strain member 20 at which compressive strain or tensile strain is generated only at the sides of the connecting shaft 23.

Figure 5:
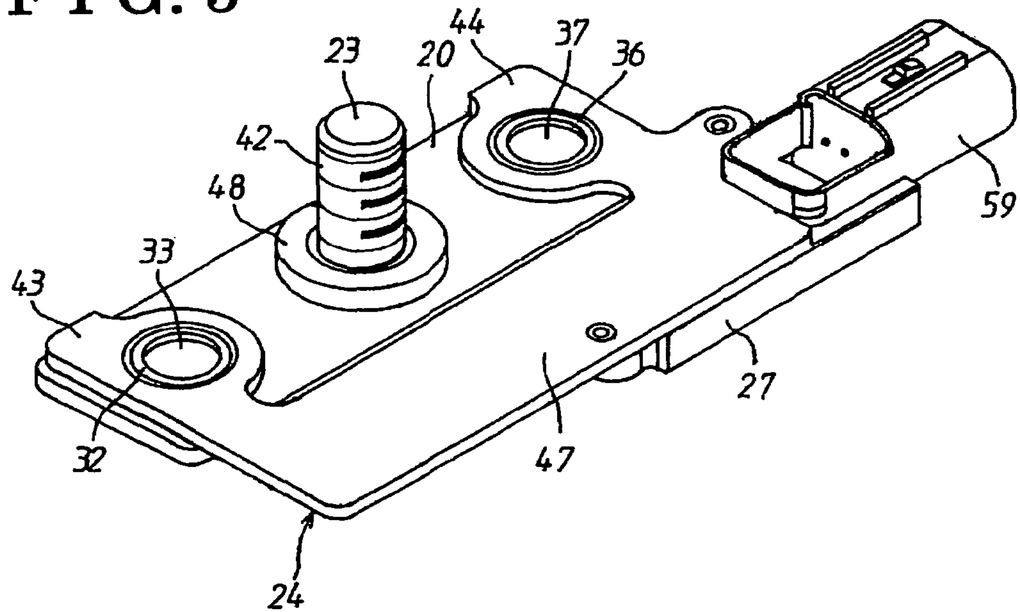
FIG. 5 is a perspective view illustrating the load detecting device assembled.

As illustrated in FIGS. 5 and 6, each upper bracket 24 is fixedly assembled on the upper surface of the strain member 20 at the both ends of the strain member 20 via the fixed portions 43, 44. The upper bracket 24 is provided with the fixed portions 43, 44 at both ends, at which fixed through-holes 45, 46 are formed respectively. The upper shaft portion 32 of the first lower bracket 21, which protrudes from the upper surface of the strain member 20, is press-fitted into the fixed through-hole 45. The intermediate shaft portion 36 of the second lower bracket 22, which protrudes from the upper surface of the strain member 20, is press-fitted into the fixed through-hole 46. The strain member 20 is hence supportively interposed at its both ends between the fixed portions 43, 44 of the upper bracket 24 and the base portions 29, 34 of the lower brackets 21, 22. The upper bracket 24 is formed with the attachment portion 47 connecting the fixed portions 43 and 44. The attachment portion 47 is arranged at the side of the strain member 20, i.e., extends in a direction perpendicular to an elongation (longitudinal) direction of the strain member 20. Although the fixed portions 43 and 44 of the upper bracket 24 overlap the strain member 20, the attachment portion 47 of the upper bracket 24 does not overlap the strain member 20. Therefore, the upper bracket 24 is not influenced by the strain or deformation of the strain member 20, thereby enabling to measure a load of an occupant accurately.

The attachment portion 47 of the upper bracket 24 is firmly fixed with the amplifier case 27*a*, which is made of for example resin, by a screw 49 along the strain member 20. Because the amplifier case 27*a* is made of resin, it leads to a weight and cost saving amplifier case. The amplifier unit 27 is arranged to be coplanar with the strain member 20 at the surface of the attachment portion 47 of the upper bracket 24 corresponding to the strain member 20. More specifically, the amplifier case 27*a* houses therein the amplifier substrate 26 positioned to be coplanar with the surface of the strain member 20 attached with the strain gauges G1, G2. The amplifier substrate 26 is employed to amplify the signal transmitted by the strain gauges G1 and G2. The amplifier case 27*a* is provided with a connector 59 connected to a communication line for transmitting an output of the amplifier substrate 26 to the electronic control unit 58.

A connecting surface 62 is formed or provided at each left and right portion of the seat frame 17 of the seat 11, which connecting surface 62 faces the fixing surface 18 of the corresponding upper rail 16 in the vertical direction. Each connecting surface 62 is formed with a connecting hole 63, into which the connecting shaft 23 of the load detecting device 10 is inserted, and insertion holes 64 (see FIG. 6) at both sides of the connecting hole 63. The insertion holes 64 are inserted with fixing nuts 60, respectively.

Described below is a procedure for mounting the load detecting devices 10, which have been already assembled as illustrated in FIG. 5, at the four corners below the seat 11 between the seat frame 17 of the seat 11 and the pair of upper rails 16 of the seat slide apparatus 13. The load detecting devices 10 include a first, second, third and fourth load detecting devices 10 respectively arranged at front-left, front-right, rear-right and rear-left portions of the seat 11. The first load detecting device 10 at the front-left portion of the seat 11 is identical to the third load detecting device 10 arranged at the rear-right portion of the seat 11. The second load detecting device 10 at the front-right portion of the seat 11 is identical to the fourth load detecting device 10 at the rear-left portion of the seat 11. Each load detecting device 10 is arranged in a manner that 1) the strain member 20 is interposed between the fixing surface 18 of the corresponding upper rail 16 and the corresponding connecting surface 62 of the seat frame 17, and 2) the amplifier unit 27 is mounted at an inner side of the corresponding upper rail 16, i.e., at a position deflected or shifted to a left or right inner side of the seat 11 from a position where the seat frame 17 of the upper rail 16 faces the connecting surface 62 of the seat frame 17. Further, the connectors 59 of the load detecting sensors 10 are oriented to face each other in the forward and rearward directions of the vehicle so as to face the electronic control unit 58 secured to the floor 12 below the center of the seat 11.

According to the embodiment, the four load detecting devices 10 are mounted between the upper rail 16 and the seat frame 17 in the same mounting manner, and so the mounting of only the first load detecting device 10 at the front-left portion of the seat 11 is described below. However, the structure of each load detecting device 10 is different from each other in the arrangement of the amplifier unit 27 relative to the strain member 20 in terms of the position (left or right, forward or rearward) of each load detecting device 10 at the seat 11. For example, the amplifier unit 27 of the first load detecting device 10 at the front-left position of the seat 11 is located at the right inner side of the seat 11 relative to the strain member 20 arranged between the fixing surface 18 of the upper rail 16 and the connecting surface 62 of the seat frame 17. The amplifier unit 27 of the second load detecting device 10 at the front-right position of the seat 11 is located at the left inner side of the seat 11 relative to the strain member 20 arranged between the fixing surface 18 of the upper rail 16 and the connecting surface 62 of the seat frame 17. The amplifier unit 27 of the third load detecting device 10 at the rear-right position of the seat 11 is located at the left inner side of the seat 11 relative to the strain member 20 arranged between the fixing surface 18 of the upper rail 16 and the connecting surface 62 of the seat frame 17. The amplifier unit 27 of the fourth load detecting device 10 at the rear-left position of the seat 11 is located at the right inner side of the seat 11 relative to the strain member 20 arranged between the fixing surface 18 of the upper rail 16 and the connecting surface 62 of the seat frame 17. The connector 59 of the first load detecting device 10 at the front-left position of the seat 11 is oriented to point or face a rear portion of the seat 11 relative to the amplifier substrate 26. The connector 59 of the second load detecting device 10 at the front-right position of the seat 11 is oriented to point or face a rear portion of the seat 11 relative to the amplifier substrate 26. The connector 59 of the third load detecting device 10 at the rear-right position of the seat 11 is oriented to point or face a front portion of the seat 11 relative to the amplifier substrate 26. The connector 59 of the fourth load detecting device 10 at the rear-left position of the seat 11 is oriented to point or face a front portion of the seat 11 relative to the amplifier substrate 26. Therefore, an identically structured load detecting device 10 is employed for the front-left and rear-right positions of the seat 11, and another identically structured load detecting device 10 is employed for the front-right and rear-left positions of the seat 11. That is, the four load detecting devices 10 are achieved with two types of load detecting devices.

In the meantime, as illustrated in FIG. 2, one of the pair of fixed shafts 19 protruding vertically upwardly at each end of the upper rail 16 is fitted into the attachment hole 33 of the first lower bracket 21 and the other one thereof is fitted into the attachment hole 37 of the second lower bracket 22. The bottoms of the base portions 29, 34 of the first and second lower brackets 21, 22 are seated on the fixing surface 18. Nuts 60 are tightened to the threaded tip ends of the respective fixed shafts 19. The nuts 60 apply force vertically downwardly to the fixed portions 43, 44 of the upper bracket 24. Therefore, the strain member 20 of each load detecting device 10 is secured, at its both ends, to the fixing surface 18 of the upper rail 16 with a predetermined distance from the fixing surface 18.

The connecting surface 62 of the frame 17 is formed with a side surface 61 of the frame 17, a lower end of which is bent laterally inwardly. A fixed threaded portion 42 of the connecting shaft 23 is fitted into a connecting through-hole 63 formed at the connecting surface 62 in a manner that the bottom of the connecting surface 62 comes in contact with the upper surface of the central bracket 48. Accordingly, the frame 17 is firmly mounted on the upper rails 16 via the strain members 20. Nuts 65 are tightened to the fixed threaded portions 42 of the connecting shafts 23. The nuts 65 apply force vertically downwardly to the connecting surfaces 62 in a manner that the connecting surfaces 62 are pressed with the central brackets 48. Therefore, the connecting shafts 23 of the load detecting devices 10 are securely tightened to the frame 17 of the seat 11.

As described above, the arrangements of the fixing surface 18 of each upper rail 16 and the connecting surface 62 of the seat frame 17 enable the amplifier unit 27 and the connector 59 of each load detecting device 10 to be arranged side by side at a right or left side of the seat 11. Accordingly, it is possible to remarkably reduce the height (vertical dimension) of the load detecting device 10 housed between the fixing surface 18 of the upper rail 16 and the connecting surface 62 of the frame 17. That is, as illustrated in FIG. 6, the distance between the fixing surface 18 of the upper rail 16 and the connecting surface 62 of the seat frame 17 is required to be substantially equal to a total thickness of the thickness of each base portion 29, 34, the thickness of the strain member 20 and the thickness of the upper bracket 24. Moreover, even in a situation where the amplifier unit 27 and the connector 50 are integrally mounted on the strain member 20, the distance C1 between the fixing surface 18 of the upper rail 16 and the connecting surface 62 of the seat frame 17 is reduced effectively.

Moreover, the amplifier case 27*a* of the amplifier unit 27 is arranged in parallel with the lower rail 14 and the seat frame 17 at the side thereof. Therefore, it is possible to remarkably reduce a distance between the amplifier substrate 26 accommodated in the amplifier case 27*a* and each strain gauge G1, G2 attached to the strain member 20.

In the seat apparatus for a vehicle having the load detecting device 10 structured as described above, when an occupant is seated on the seat cushion of the seat 11, a load of an occupant is applied to the strain member 20 via the connecting shaft 23. Therefore, an intermediate portion of the strain member 20, which is supported at it both ends by the first and second lower brackets 21, 22, is flexibly bent. Therefore, at each area between the connecting shaft 23 and each first and second lower bracket 21, 22 on the surface of the stain member 20, compressive strain are generated at the sides of the first and second lower brackets 21, 22, and tensile strain are generated at the sides of the connecting shaft 23. Degrees of the compressive strain and the tensile strain are in proportion to the load of the occupant applied to the strain member 20. In order to detect the compressive strain and the tensile strain, the strain gauges G1, G2. The detected outputs of the strain gauges G1, G2 are amplified by the amplifier substrate 26 and are transmitted to the electronic control unit 58 via a communication line connected to the connector 59. As described above, a load of an occupant seated on the seat 11 is measured based upon the strain of the strain member 20. Further, it is possible to control an airbag and so on appropriately in response to a weight of an occupant, based upon the load detection result.

According to the embodiment described above, each load detecting device 10 includes: the strain member 20 fixed at its both ends at the fixing surface 18 provided at the upper rail 16 with a predetermined distance from the fixing surface 18 in a vertical direction of the seat 11; the upper bracket 24 having the first fixed portion 43 and the second fixed portion 44 both connected to the both ends of the strain member 20 at the other surface (upper surface) of the strain member 20, the upper bracket further having the attachment portion 47 connecting the first and second fixed portions 43, 44 and extending at a side of the strain member 20 in the lateral direction of the seat 11; and the amplifier unit 27 arranged to be coplanar with the strain member at a surface of the attachment portion 47 of the upper bracket 24 (corresponding to the strain member 20) and amplifying an electrical signal transmitted by the strain gauges G1, G2. Therefore, the amplifier unit 27 is arranged to be coplanar with the strain member 20 at the side of the strain member 20, and the amplifier 27 is arranged adjacent to the strain member 20. Therefore, although the amplifier unit 27 is arranged adjacent to the strain member 20, the height of each load detecting device 10 interposed between the upper rail 16 and the seat frame 17 is reduced, thereby enabling to lead to reduction in a distance between the upper rail 16 and the seat frame 17. Further, it is possible to detect a load of an occupant accurately regardless of a seat position adjustment in the forward and rearward directions.

According to the embodiment described above, the first and second lower brackets 21 and 22 fix each strain member 20 at the both ends to the fixing surface 18 of the upper rail 16. The first lower bracket 21 includes the base portion 29 having a thickness substantially equal to the predetermined distance, and the shaft portions 31 and 32 protruding at the base portion 29 and penetrating the one end of the strain member 20. The shaft portion 31 is press-fitted into the hole 30 of the strain member 20 and the shaft portion 32 is press-fitted into the fixed portion 43 of the upper bracket 24. The second lower bracket 22 includes the base portion 34 having a thickness substantially equal to the predetermined distance, and the shaft portion 36 protruding at the base portion 34 and penetrating the other end of the strain member 20. The shaft portion 36 is press-fitted into the fixed portion 44 of the upper bracket 24. The strain member 20 is hence interposed between the base portion 29, 34 and the shaft portions 31, 32 and 36. The first lower bracket 21 further includes the attachment hole 33 penetrating through the base portion 29 and the shaft portions 31 and 32. The second lower bracket 22 further includes the attachment hole 37 penetrating through the base portion 34 and the shaft portion 36. Therefore, it is possible to fix the strain member 20 at its both ends via the lower brackets 21, 22 to the fixing surface 18 of the upper rail 16 with a predetermined distance relative to the fixing surface 18. Further, a load applied to the seat frame 17 is applied to the intermediate portion of the strain member 20, so that a load of an occupant is detected precisely.

According to the embodiment, the seat 11 is provided with a total of four load detecting devices 10 at the front-left, front-right rear-right and rear-left portions of the seat 11, respectively. An identically structured load detecting device 10 is employed for the front-left and rear-right positions of the seat 11, and another identically structured load detecting device 10 is employed for the front-right and rear-left positions of the seat 11. That is, the four load detecting devices 10 are achieved with two types of load detecting devices, so that a load of an occupant is detected accurately.

According to the embodiment, the seat 11 is provided with the four connectors 59 connected to communication lines for transmitting outputs of the amplifier substrates 26 to the electronic control unit 58, respectively. The connector 59 at the front-left position of the seat 11 is arranged at the inner side of the seat in the lateral direction and is oriented to point or face the longitudinally rear portion of the seat 11 relative to the amplifier substrate 26. The connector 59 at the front-right position of the seat 11 is arranged at the inner side of the seat 11 in the lateral direction and is oriented in the longitudinally rear portion of the seat 11 relative to the amplifier substrate 26. The connector 59 at the rear-right position of the seat 11 is arranged at the inner side of the seat 11 in the lateral direction and is oriented to point or face the longitudinally front portion of the seat 11 relative to the amplifier substrate 26. The connector 59 at the rear-left position of the seat 11 is arranged at the inner side of the seat 11 in the lateral direction and is oriented to point or face the longitudinally front portion of the seat 11 relative to the amplifier substrate 26. That is, the four connectors 50 face each other. Therefore, all of the connectors 59 face each other, and the communication lines connected to the connectors 59 are put together at the inner side (central portion) of the seat 11.

According to the embodiment, the first and second lower brackets 21, 22 of each load detecting device 10 is secured to the upper rail 16 and the connecting shaft 23 thereof is secured to the seat frame 17. Alternatively, the first and second lower brackets 21, 22 can be secured to the seat frame 17 and the connecting shaft 23 can be secured to the upper rail 16.

According to the embodiment, the first and second fixed portions 43, 44 of the upper bracket 24 are fixed to the upper surface of the strain member 20, and the amplifier unit 27 is attached to the lower surface of the attachment portion 47 of the upper bracket 24 extending in the lateral direction of the strain member 20. Alternatively, the first and second fixed portions 43, 44 of the upper bracket 24 can be fixed to the lower surface of the strain member 20, and the amplifier unit 27 can be attached to the upper surface of the attachment portion 47 of the upper bracket 24. In this case, the amplifier unit 27 is still arranged to be substantially coplanar with the strain member 20.

The principles, of the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A seat apparatus for a vehicle having a load detecting device arranged between a floor-side fixing member adapted to be fixed to a floor of the vehicle and a seat-side fixing member adapted to be fixed to a seat for the vehicle and for measuring a load of an occupant seated on the seat, the load detecting device comprising:

a strain member fixed at its both ends at a fixing surface provided at one of the floor-side fixing member and the seat-side fixing member with a predetermined distance from the fixing surface in a vertical direction of the seat;

a connecting member vertically fixed to an intermediate portion of the strain member and fixed to the other one of the floor-side fixing member and the seat-side fixing member;

strain gauges attached on a surface of the strain member;

an upper bracket having a first fixed portion and a second fixed portion both fixed to the other surface of the strain member at the both ends of the strain member, the upper bracket further having an attachment portion connecting the first and second fixed portions and extending in a lateral direction of the seat;

an amplifier unit attached to a surface of the attachment portion of the upper bracket corresponding to the strain member so as to be coplanar with the strain member;

a first lower bracket and a second lower bracket fixed, at the both ends of the strain member, to the fixing surface provided at the one of the floor-side fixing member and the seat-side fixing member, and each of the first and second lower brackets has a base portion having a height identical to the predetermined distance, a shaft portion protruding from the base portion, the shaft portion penetrating the both ends of the strain member and press-fitted into the first and second fixed portions of the upper bracket to be fixed thereto so that the strain member is interposed between the base portion and the shaft portion, and an attachment hole penetrating through the shaft portion and the base portion; and wherein the fixing surface is provided at the floor-side fixing member and the strain member is fixed to the fixing surface of the floor-side fixing member via the first and second lower brackets, and the seat-side fixing member includes a connecting surface and the intermediate portion of the strain member is connected to the connecting surface of the seat-side fixing member via the connecting member.

2. A seat apparatus for a vehicle having a load detecting device according to claim 1, wherein the other surface of the strain member is an upper surface of the strain member and the first and second fixed portions of the upper bracket are fixed to the upper surface of the strain member at the both ends of the strain member, and the surface of the attachment portion of the upper bracket is a lower surface of the attachment portion of the upper bracket and the amplifier unit is attached to the lower surface of the attachment portion of the upper bracket.

3. A seat apparatus for a vehicle having a load detecting device according to claim 1, wherein the floor-side fixing member is an upper rail supported by a lower rail fixed to the floor so that the floor-side fixing member is movable in a longitudinal direction, and the seat-side fixing member is a seat frame supporting a seat cushion.

4. A seat apparatus for a vehicle having a load detecting device according to claim 1, wherein the load detecting device includes first, second, third and fourth load detecting devices respectively arranged at front-left, front-right, rear-right and rear-left portions of the seat, the first load detecting device arranged at the front-left portion of the seat is identical to the third load detecting device arranged at the rear-right portion of the seat, and the second load detecting device arranged at the front-right portion of the seat is identical to the fourth load detecting device arranged at the rear-left portion of the seat.

5. A seat apparatus for a vehicle having a load detecting device according to claim 4, wherein the amplifier unit includes first, second, third and fourth amplifier units of the first, second, third and fourth load detecting devices, respectively, and the first amplifier unit houses therein a first amplifier substrate and is provided with a first connector arranged at an inner side of the seat in the lateral direction and oriented to face a longitudinally rear portion of the seat, the second amplifier unit houses therein a second amplifier substrate and is provided with a second connector arranged at the inner side of the seat in the lateral direction and oriented to face the longitudinally rear portion of the seat, the third amplifier unit houses therein a third amplifier substrate and is provided with a third connector arranged at the inner side of the seat in the lateral direction and oriented to face a longitudinally front portion of the seat, and the fourth amplifier unit houses therein a fourth amplifier substrate and is provided with a fourth connector arranged at the inner side of the seat in the lateral direction and oriented to face a longitudinally front portion of the seat, whereby the first and third connectors face each other, and second and fourth connectors face each other.

6. A seat apparatus for a vehicle having a load detecting device arranged between a floor-side fixing member adapted to be fixed to a floor of the vehicle and a seat-side fixing member adapted to be fixed to a seat for the vehicle and for measuring a load of an occupant seated on the seat, the load detecting device comprising:

a strain member fixed at its both ends at a fixing surface provided at one of the floor-side fixing member and the seat-side fixing member with a predetermined distance from the fixing surface in a vertical direction of the seat;

a connecting member vertically fixed to an intermediate portion of the strain member and fixed to the other one of the floor-side fixing member and the seat-side fixing member;

strain gauges attached on a surface of the strain member;

an upper bracket having a first fixed portion and a second fixed portion both fixed to the other surface of the strain member at the both ends of the strain member, the upper bracket further having an attachment portion connecting the first and second fixed portions and extending in a lateral direction of the seat;

an amplifier unit attached to a surface of the attachment portion of the upper bracket corresponding to the strain member so as to be coplanar with the strain member; and wherein the other surface of the strain member is an upper surface of the strain member and the first and second fixed portions of the upper bracket are fixed to the upper surface of the strain member at the both ends of the strain member, and the surface of the attachment portion of the upper bracket is a lower surface of the attachment portion of the upper bracket and the amplifier unit is attached to the lower surface of the attachment portion of the upper bracket.

7. A seat apparatus for a vehicle having a load detecting device according to claim 6, wherein the floor-side fixing member is an upper rail supported by a lower rail fixed to the floor so that the floor-side fixing member is movable in forward and rearward directions, and the seat-side fixing member is a seat frame supporting a seat cushion.

8. A seat apparatus for a vehicle having a load detecting device according to claim 6, wherein the load detecting device includes first, second, third and fourth load detecting devices respectively arranged at front-left, front-right, rear-right and rear-left portions of the seat, the first load detecting device arranged at the front-left portion of the seat is identical to the third load detecting device arranged at the rear-right portion of the seat, and the second load detecting device arranged at the front-right portion of the seat is identical to the fourth load detecting device arranged at the rear-left portion of the seat.

9. A seat apparatus for a vehicle having a load detecting device according to claim 8, wherein the amplifier unit includes first, second, third and fourth amplifier units of the first, second, third and fourth load detecting devices, respectively, and the first amplifier unit houses therein a first amplifier substrate and is provided with a first connector arranged at an inner side of the seat in the lateral direction and oriented to face a longitudinally rear portion of the seat, the second amplifier unit houses therein a second amplifier substrate and is provided with a second connector arranged at the inner side of the seat in the lateral direction and oriented to face the longitudinally rear portion of the seat, the third amplifier unit houses therein a third amplifier substrate and is provided with a third connector arranged at the inner side of the seat in the lateral direction and oriented to face a longitudinally front portion of the seat, and the fourth amplifier unit houses therein a fourth amplifier substrate and is provided with a fourth connector arranged at the inner side of the seat in the lateral direction and oriented to face a longitudinally front portion of the seat, whereby the first and third connectors face each other, and second and fourth connectors face each other.

10. A seat apparatus for a vehicle having a load detecting device arranged between a floor-side fixing member adapted to be fixed to a floor of the vehicle and a seat-side fixing member adapted to be fixed to a seat for the vehicle and for measuring a load of an occupant seated on the seat, the load detecting device comprising:

a strain member fixed at its both ends at a fixing surface provided at one of the floor-side fixing member and the seat-side fixing member with a predetermined distance from the fixing surface in a vertical direction of the seat;

a connecting member vertically fixed to an intermediate portion of the strain member and fixed to the other one of the floor-side fixing member and the seat-side fixing member;

strain gauges attached on a surface of the strain member;

an upper bracket having a first fixed portion and a second fixed portion both fixed to the other surface of the strain member at the both ends of the strain member, the upper bracket further having an attachment portion connecting the first and second fixed portions and extending in a lateral direction of the seat;

an amplifier unit attached to a surface of the attachment portion of the upper bracket corresponding to the strain member so as to be coplanar with the strain member;

a first lower bracket and a second lower bracket fixed, at the both ends of the strain member, to the fixing surface provided at the one of the floor-side fixing member and the seat-side fixing member, and each of the first and second lower brackets has a base portion having a height identical to the predetermined distance, a shaft portion protruding from the base portion, the shaft portion penetrating the both ends of the strain member and press-fitted into the first and second fixed portions of the upper bracket to be fixed thereto so that the strain member is interposed between the base portion and the shaft portion, and an attachment hole penetrating through the shaft portion and the base portion; and wherein the floor-side fixing member is an upper rail supported by a lower rail fixed to the floor so that the floor-side fixing member is movable in forward and rearward directions, and the seat-side fixing member is a seat frame supporting a seat cushion.

11. A seat apparatus for a vehicle having a load detecting device arranged between a floor-side fixing member adapted to be fixed to a floor of the vehicle and a seat-side fixing member adapted to be fixed to a seat for the vehicle and for measuring a load of an occupant seated on the seat, the load detecting device comprising:

a strain member fixed at its both ends at a fixing surface provided at one of the floor-side fixing member and the seat-side fixing member with a predetermined distance from the fixing surface in a vertical direction of the seat;

a connecting member vertically fixed to an intermediate portion of the strain member and fixed to the other one of the floor-side fixing member and the seat-side fixing member;

strain gauges attached on a surface of the strain member;

an upper bracket having a first fixed portion and a second fixed portion both fixed to the other surface of the strain member at the both ends of the strain member, the upper bracket further having an attachment portion connecting the first and second fixed portions and extending in a lateral direction of the seat;

an amplifier unit attached to a surface of the attachment portion of the upper bracket corresponding to the strain member so as to be coplanar with the strain member;

a first lower bracket and a second lower bracket fixed, at the both ends of the strain member, to the fixing surface provided at the one of the floor-side fixing member and the seat-side fixing member, and each of the first and second lower brackets has a base portion having a height identical to the predetermined distance, a shaft portion protruding from the base portion, the shaft portion penetrating the both ends of the strain member and press-fitted into the first and second fixed portions of the upper bracket to be fixed thereto so that the strain member is interposed between the base portion and the shaft portion, and an attachment hole penetrating through the shaft portion and the base portion; and wherein the load detecting device includes first, second, third and fourth load detecting devices respectively arranged at front-left, front-right, rear-right and rear-left portions of the seat, the first load detecting device arranged at the front-left portion of the seat is identical to the third load detecting device arranged at the rear-right portion of the seat, and the second load detecting device arranged at the front-right portion of the seat is identical to the fourth load detecting device arranged at the rear-left portion of the seat, wherein the first load detecting device differs from the second load detecting device.

12. A seat apparatus for a vehicle having a load detecting device according to claim 11, wherein the amplifier unit includes first, second, third and fourth amplifier units of the first, second, third and fourth load detecting devices, respectively, and the first amplifier unit houses therein a first amplifier substrate and is provided with a first connector arranged at an inner side of the seat in the lateral direction and oriented to face a longitudinally rear portion of the seat, the second amplifier unit houses therein a second amplifier substrate and is provided with a second connector arranged at the inner side of the seat in the lateral direction and oriented to face the longitudinally rear portion of the seat, the third amplifier unit houses therein a third amplifier substrate and is provided with a third connector arranged at the inner side of the seat in the lateral direction and oriented to face a longitudinally front portion of the seat, and the fourth amplifier unit houses therein a fourth amplifier substrate and is provided with a fourth connector arranged at the inner side of the seat in the lateral direction and oriented to face a longitudinally front portion of the seat, whereby the first and third connectors face each other, and second and fourth connectors face each other.

13. A seat apparatus for a vehicle having a load detecting device for measuring a load of an occupant seated on a seat of the vehicle, the load detecting device being arranged between a first member and a second member, one of the first and second members being a floor-side fixing member adapted to be fixed to a floor of the vehicle and the other of the first and second members being a seat-side fixing member adapted to be fixed to the seat, the load detecting device comprising:

a strain member having ends which are both fixed relative to a fixing surface of the first member so that the strain member is spaced a predetermined distance from the fixing surface in a vertical direction of the seat, the strain member possessing oppositely facing first and second surfaces;

a connecting member vertically fixed to an intermediate portion of the strain member and fixed to the second member;

strain gauges attached to the first surface of the strain member;

an upper bracket having a first fixed portion fixed to the second surface of the strain member at one end of the strain member and a second fixed portion fixed to the second surface of the strain member at the other end of the strain member, the upper bracket further having an attachment portion connecting the first and second fixed portions and extending in a lateral direction of the seat;

an amplifier unit attached to an attachment surface of the attachment portion of the upper bracket; and the strain member and the amplifier unit being located, in a vertical direction of the seat, between the fixing surface of the first member and the attachment surface of the attachment portion of the upper bracket.

* * * * *